(12) United States Patent
You (10) Patent No.: US 11,742,138 B2
(45) Date of Patent: Aug. 29, 2023

(54) WIRELESS POWER RECEPTION APPARATUS AND A METHOD OF MANUFACTURING THE SAME

(71) Applicant: THE GAUSS INC., Gunpo-si (KR)

(72) Inventor: Bong Gi You, Yongin-si (KR)

(73) Assignee: THE GAUSS INC., Gunpo-si (KR)

(*) Notice: Subject to any disclaimer, the term of this patent is extended or adjusted under 35 U.S.C. 154(b) by 429 days.

(21) Appl. No.: 17/081,252

(22) Filed: Oct. 27, 2020

(65) Prior Publication Data
US 2022/0130604 A1 Apr. 28, 2022

(30) Foreign Application Priority Data

Oct. 22, 2020 (KR) .................. 10-2020-0137798

(51) Int. Cl.
*H01F 27/24* (2006.01)
*H01F 38/14* (2006.01)
(Continued)

(52) U.S. Cl.
CPC .............. *H01F 38/14* (2013.01); *B60L 53/12* (2019.02); *H01F 27/2885* (2013.01);
(Continued)

(58) Field of Classification Search
CPC ...... H01F 38/14; H01F 27/2885; H01F 27/36; H01F 41/005; H01F 41/04; H01F 27/022;
(Continued)

(56) References Cited

U.S. PATENT DOCUMENTS

| 6,888,438 | B2* | 5/2005 | Hui | H01F 27/361 |
| | | | | 336/200 |
| 8,760,253 | B2 | 6/2014 | Hickox | |
| 9,653,797 | B2* | 5/2017 | Park | H01Q 7/06 |
| 9,680,329 | B2 | 6/2017 | Janssen et al. | |
| 11,232,899 | B2* | 1/2022 | Jang | H01F 27/366 |
| 2015/0145632 | A1* | 5/2015 | Fukuzawa | H01F 38/14 |
| | | | | 336/221 |

(Continued)

FOREIGN PATENT DOCUMENTS

| CN | 209634301 U | 11/2019 |
| JP | 2019-160596 A | 9/2019 |

(Continued)

*Primary Examiner* — Mang Tin Bik Lian
(74) *Attorney, Agent, or Firm* — Bridgeway IP Law Group, PLLC; Jihun Kim (57) ABSTRACT

A method of manufacturing a wireless power reception apparatus includes: forming a lower tray that includes a thermally conductive material and accommodates and fix a coil winding; arranging a coil winding on the lower tray; forming a magnetic field shielding plate so as to accommodate and fix a plurality of magnetic tiles at predetermined intervals; forming a coupled member of a magnetic tiles-magnetic field shielding plate by arranging the plurality of magnetic tiles at the predetermined intervals on the magnetic field shielding plate; forming a thermally conductive polymer molding layer by applying a thermally conductive polymer molding solution to fill spaces between the coil winding and the coupled member of a magnetic tiles-magnetic field shielding plate and bonding the plurality of magnetic tiles and the coil winding such that the plurality of magnetic tiles are positioned over the coil winding; and curing the thermally conductive polymer molding layer.

6 Claims, 5 Drawing Sheets

(51) Int. Cl.
*H01F 27/28* (2006.01)
*H01F 27/36* (2006.01)
*B60L 53/12* (2019.01)
*H02J 50/12* (2016.01)
*H02J 50/70* (2016.01)
*H01F 41/04* (2006.01)
*H01F 41/00* (2006.01)

(52) U.S. Cl.
CPC ........... *H01F 27/36* (2013.01); *H01F 41/005* (2013.01); *H01F 41/04* (2013.01); *H02J 50/12* (2016.02); *H02J 50/70* (2016.02)

(58) Field of Classification Search
CPC .... H01F 27/025; H01F 3/08; H01F 2005/027; H01F 27/361; H01F 27/363; H01F 27/366; H01F 27/323; H01F 27/324; H01F 27/327; H01F 27/24; H01F 27/02
See application file for complete search history.

(56) References Cited

U.S. PATENT DOCUMENTS

| | | | |
|---|---|---|---|
| 2015/0170833 A1* | 6/2015 | Widmer | H02J 50/12 307/104 |
| 2015/0288067 A1* | 10/2015 | Kwon | H01Q 9/0407 320/108 |
| 2015/0349578 A1* | 12/2015 | Hu | H01F 27/2804 320/108 |
| 2019/0006094 A1* | 1/2019 | Furiya | H01F 27/24 |
| 2020/0118738 A1* | 4/2020 | Yuasa | H01F 27/363 |
| 2022/0037924 A1* | 2/2022 | Schrafel | H01F 38/14 |

FOREIGN PATENT DOCUMENTS

| | | |
|---|---|---|
| JP | 2019-165096 A | 9/2019 |
| KR | 10-2016-0037650 A | 4/2016 |
| KR | 10-2020-0016084 A | 2/2020 |
| WO | 2016/159551 A1 | 10/2016 |

* cited by examiner

FIG. 1

Prior Art

WIRELESS POWER RECEPTION APPARATUS AND A METHOD OF MANUFACTURING THE SAME

BACKGROUND OF THE INVENTION

Field of the Invention

The present invention relates to a wireless power reception apparatus for wireless charging, and more specifically, to a wireless power reception apparatus for an electric car adopting an inductive power transfer (IPT) manner and a method of manufacturing the same.

Description of the Related Art

A wireless power transfer (WPT) technology is a power transfer technology for wirelessly transferring power to a load, and there has been a gradual increase in application range of the wireless power transfer technology not only to a mobile and wearable instrument but also to high-power and long-distance transfer for an electric vehicle or the like. A wireless power transfer method includes an inductive power transfer (IPT) method, a resonant power transfer (RPT) method, and a capacitive power transfer (CPT) method, and so on. In recent years, as both efficiency and energy density are higher in the inductive power transfer (IPT) type and the resonant inductive power transfer (RIPT) type than in the capacitive power transfer (CPT) type, and the IPT type and the RIPT type are mainly used in wirelessly transmitting power in order to charge an electric car. In the IPT type, power is transferred by an electromagnetic induction between a coil in a wireless power transmission apparatus and a coil in a wireless power reception apparatus. In the RIPT type, a resonant inverter is used as an inverter in the IPT type such that a resonant method is additionally used in wireless power transmission.

General wireless inductive power transmission and reception apparatuses are configured to decrease a leakage of an inductive magnetic field by using a magnetic body to absorb the inductive magnetic field generated through a coil or change a path thereof and induce high magnetic coupling so as to improve transfer efficiency. Therefore, the charging efficiency thereof is determined depending on transmission and/or reception coil pads into which the magnetic body is inserted. In particular, a reception coil pad of a wireless power reception apparatus installed in a moving object such as an electric car needs to be developed to particularly satisfy reliability of impact resistance, vibration resistance, water resistance, dust resistance, temperature, or the like, in order to maintain a charging function and efficiency.

SUMMARY OF THE INVENTION

A technical object of the invention is to provide a wireless power reception apparatus and/or a method of manufacturing the same by which it is possible to extend a service life of the wireless power reception apparatus by maintaining magnetic performance and arrangement of a coil winding and, thus, preventing a reduction in wireless power reception rate, even when a magnetic body of an IPT or RIPT wireless power reception apparatus is broken or damaged due to a large impact occurring outside a vehicle.

Another technical object of the invention is to provide a wireless power reception apparatus and/or a method of manufacturing the same which can improve power reception efficiency by minimizing air gaps between a coil winding and a magnetic body and between coils in the wireless power reception apparatus so as to maximize heat dissipation, and which can prevent the power reception efficiency from being degraded even after time elapses, with a simplified, cheaper process of manufacturing a wireless power reception apparatus.

In addition, a still another technical object of the invention is to provide a wireless power reception apparatus and/or a method of manufacturing the same which has strengthened functions of impact resistance, vibration resistance, water resistance, and dust resistance while maintaining high heat dissipation, with a simplified, cheaper process of manufacturing a wireless power reception apparatus.

Technical objects to be achieved by the invention are not limited to the technical objects mentioned above, and the following description enables other unmentioned technical objects to be clearly understood by a person of ordinary skill in the art to which the invention belongs.

In order to achieve the technical objects, a method of manufacturing a wireless power reception apparatus according to an embodiment of the invention may include: forming a lower tray that includes a thermally conductive material and accommodates and fix a coil winding; arranging a coil winding, which generates magnetically inductive power, on the lower tray; forming a magnetic field shielding plate so as to accommodate and fix a plurality of magnetic tiles at predetermined intervals; forming a coupled member of a magnetic tiles-magnetic field shielding plate by arranging the plurality of magnetic tiles at the predetermined intervals on the magnetic field shielding plate; forming a thermally conductive polymer molding layer by applying a thermally conductive polymer molding solution to fill spaces between the coil winding and the coupled member of a magnetic tiles-magnetic field shielding plate and bonding the plurality of magnetic tiles and the coil winding such that the plurality of magnetic tiles are positioned over the coil winding; and curing the thermally conductive polymer molding layer by drying the thermally conductive polymer molding solution between the coil winding and the coupled member of a magnetic tiles-magnetic field shielding plate.

According to the embodiment of the invention, in applying the thermally conductive polymer molding solution, the thermally conductive polymer molding solution is applied to fill spaces between coils of the coil winding and spaces between the plurality of magnetic tiles.

According to the embodiment of the invention, the magnetic tiles may include a soft magnetic material, which includes at least one of ferrite, permalloy, iron (Fe), a soft magnetic composite (SMC), permalloy (Fe50Ni50), Mn—Zn ferrite, Ni—Zn ferrite, Fe-(1 to 6.5 wt % of Si)—Cr, sendust (Fe85Si9.5Al5.5), Fe amorphous (Fe78B13Si9), Co amorphous (Co67Fe4B14.5Si4.5), and nanocrystals.

According to the embodiment of the invention, the thermally conductive polymer molding solution may include any one selected from a group consisting of alumina ($Al_2O_3$), BeO, ZnO, MgO, SiC, AlN, SiZN, BN, carbon nanotube, diamond, and a combination thereof and may include at least one mixture of the combination and a polymer.

According to the embodiment of the invention, the thermally conductive polymer molding solution may include a mixture of a heat-resistant polymer and thermally conductive fillers.

According to the embodiment of the invention, the thermally conductive polymer molding solution may include a mixture of thermally conductive polymers in which soft magnetic metal particles are dispersed.

According to the embodiment of the invention, the soft magnetic metal particles may include at least one of iron (Fe), permalloy (Fe50Ni50), Mn—Zn ferrite, Fe-(1 to 6.5 wt % of Si), sendust (Fe85Si9.5Al5.5), Fe amorphous (Fe78B13Si9), Co amorphous (Co67Fe4B14.5Si4.5), and a nanocrystal alloy or an alloy thereof, and the thermally conductive polymers may include at least one of epoxy, silicon, and urethane or a mixture thereof.

In order to achieve the technical objects, a wireless power reception apparatus according to another embodiment of the invention may include: a lower tray that includes a thermally conductive material and is formed to accommodate and fix a coil winding; a coil winding that is positioned on the lower tray and generates magnetically inductive power; a plurality of magnetic tiles that are positioned over the coil winding; a magnetic field shielding plate that shields a magnetic field and is formed to accommodate and fix the plurality of magnetic tiles at predetermined intervals; and a thermally conductive polymer molding layer that fills spaces between the coil winding and the plurality of magnetic tiles and bonds the coil winding and the plurality of magnetic tiles.

According to the other embodiment of the invention, the thermally conductive polymer molding layer may be formed to further fill spaces between coils of the coil winding and spaces between the plurality of magnetic tiles.

According to the other embodiment of the invention, the magnetic tiles include a soft magnetic material, which includes at least one of ferrite, permalloy, iron (Fe), a soft magnetic composite (SMC), permalloy (Fe50Ni50), Mn—Zn ferrite, Ni—Zn ferrite, Fe-(1 to 6.5 wt % of Si)—Cr, sendust (Fe85Si9.5Al5.5), Fe amorphous (Fe78B13Si9), Co amorphous (Co67Fe4B14.5Si4.5), and nanocrystals.

According to the other embodiment of the invention, the thermally conductive polymer molding layer may include any one selected from a group consisting of alumina ($Al_2O_3$), BeO, ZnO, MgO, SiC, AlN, SiZN, BN, carbon nanotube, diamond, and a combination thereof and may include at least one mixture of the combination and a polymer.

According to the other embodiment of the invention, the thermally conductive polymer molding layer may include a mixture of a heat-resistant polymer and thermally conductive fillers.

According to the other embodiment of the invention, the thermally conductive polymer molding layer may include a mixture of thermally conductive polymers in which soft magnetic metal particles are dispersed.

According to the other embodiment of the invention, the soft magnetic metal particles may include at least one of iron (Fe), permalloy (Fe50Ni50), Mn—Zn ferrite, Fe-(1 to 6.5 wt % of Si), sendust (Fe85Si9.5Al5.5), Fe amorphous (Fe78B13Si9), Co amorphous (Co67Fe4B14.5Si4.5), and a nanocrystal alloy or an alloy thereof, and the thermally conductive polymer may include at least one of epoxy, silicon, and urethane or a mixture thereof.

DETAILED DESCRIPTION OF THE PREFERRED EMBODIMENTS

Hereinafter, the invention will be described with reference to the accompanying drawings. However, the invention may be realized as various different examples and thus is not limited to embodiments described here. Besides, a part irrelevant to the description is omitted from the drawings in order to clearly describe the invention, and similar reference signs are assigned to similar parts through the entire specification. In the accompanying drawings, dimensions of configurational elements are schematically illustrated for simple visualization and do not define or limit dimensions of configurational elements of an actual wireless power reception apparatus.

In the entire specification, a case where a certain part is "connected to (attached to, in contact with, or coupled to)" another part means not only a case where the parts are "directly connected" to each other, but also a case where the parts are "indirectly connected" to each other with another member interposed therebetween. In addition, a case where a certain part "comprises" a certain configurational element does not mean that another configurational element is excluded, but means that the configurational element may be further included, unless specifically described otherwise.

Terms used in this specification are only used to describe a specific embodiment and are not intentionally used to limit the invention thereto. A singular noun includes a meaning of its plural form, unless obviously implied otherwise in context. In this specification, words such as "to comprise" or "to include" need to be construed to specify that a feature, a number, a step, an operation, a configurational element, a member, or an assembly thereof described in the specification is present and not to exclude presence or a possibility of addition of one or more other features, numbers, steps, operations, configurational elements, members, or assemblies thereof in advance.

Hereinafter, in order for the invention to be easily understood, the preferred embodiments are provided; however, the preferred embodiments are only provided as examples of the invention. Hence, it is obvious for those skilled in the art that various changes and modifications may be performed on the invention within the scope and the technical ideas of the invention, and it is needless to say that the changes and modifications belong to the accompanying claims.

Preferable examples of a material of a magnetic body used in inductive power transmission and reception apparatuses are a ferrite-based material, a soft magnetic material such as a soft magnetic metal alloy or a soft magnetic composite which has high permeability, low coercivity, and a low hysteresis loss and thus is effective in increasing magnetic flux density, and the ferrite-based material is recently used in many cases. A ferrite has very high brittleness, so it has a problem that it is easily broken or cracked off with a small impact and thus it is difficult to perform machining and application of the ferrite. In this respect, the inventors of the invention of this application have recognized that a problem arises in that, when the wireless power reception apparatus is installed in an electric car, a wireless power reception apparatus may not fully exhibit an aimed power receiving function since a ferrite magnetic body is easily cracked off with even a small impact generated during running or parking such as a frictional force of a road surface during running, vibration due to a neighboring vehicle or a surrounding situation, or an impact that may be generated due to a weather issue. In addition, a large impact or high vibration generated during running or parking influences intervals or arrangement of a coil winding in a wireless power reception apparatus which is designed depending on aimed effective permeability, reduces power reception efficiency, and results in degradation of the wireless power reception apparatus.

The prior art tried to promote dissipating heat generated at the coil winding during charging by having a tray or a layer made of a thermally conductive material on one surface of the coil winding so as to improve dissipation of heat to the outside. Nevertheless, it is found that many problems still arise due to heat in air gaps near an opposite surface of the one surface of the coil winding on which the thermally conductive layer is formed, that is, toward a magnetic body, and in spaces between coil turns in the coil winding. In particular, the inventors of the present application have recognized that low thermal conductivity of multiple air gaps between coil turns and/or between a coil and a magnetic body weakens a power reception rate of the coil pad, deteriorates the magnetic body over time, and has an adverse effect on power reception rate of a wireless power reception apparatus.

For example, when a magnetic body includes a ferrite, a core loss of the ferrite, which is calculated from Legg's equation, varies significantly depending on a surrounding temperature and the core loss variation decreases permeability of the ferrite. Therefore, when heat generated at the coil winding is kept in air gaps inside a coil pad and thus sufficient heat dissipation is not performed, and when this state lasts, the power reception efficiency of the coil pad rapidly decreases over time, thus the becoming the major reason for degradation of the wireless power reception apparatus.

Figure 1:
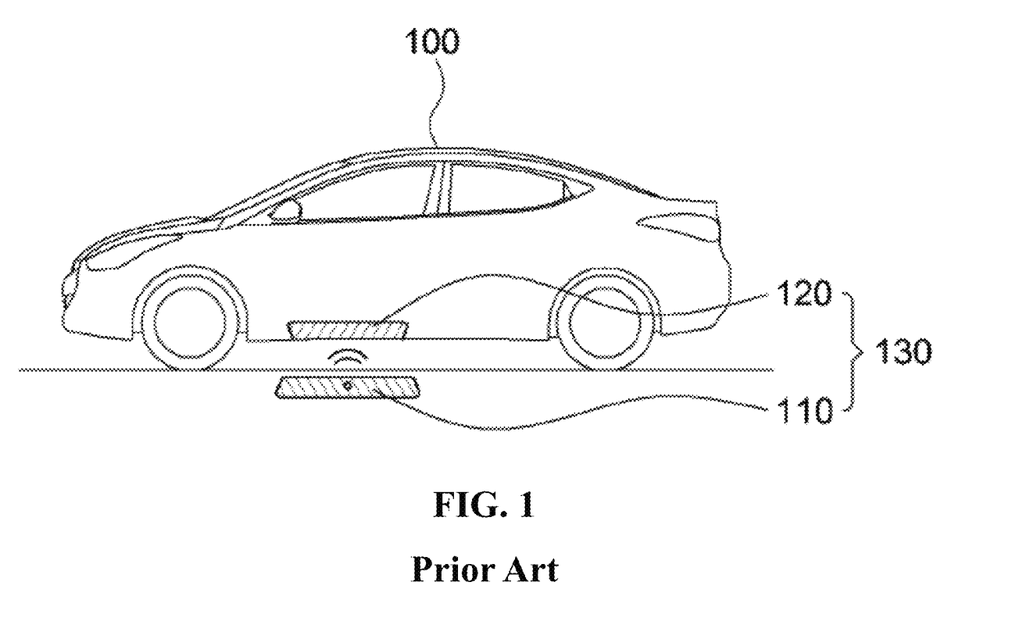
FIG. 1 is a schematic diagram of a general wireless charging system for a vehicle which includes a wireless power transmission apparatus and a wireless power reception apparatus.
Figure 2A:
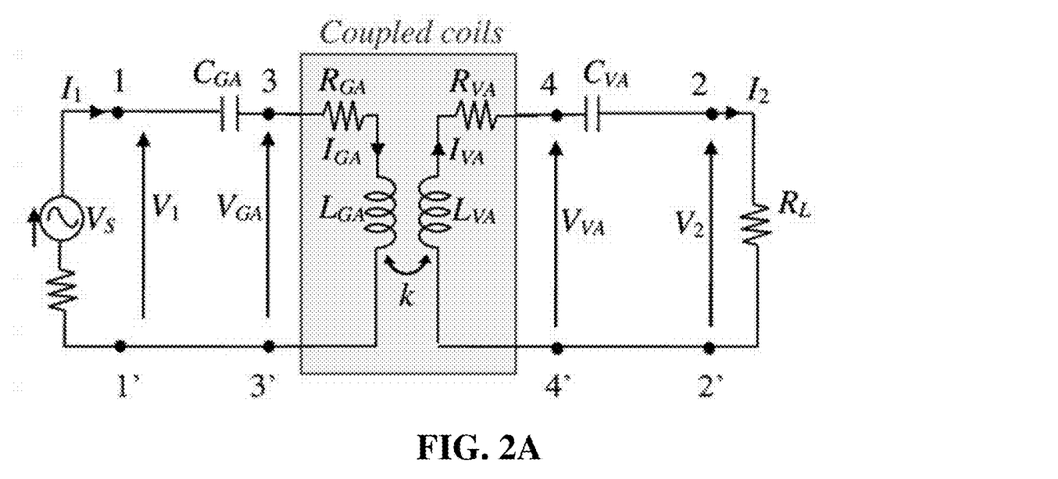
FIGS. 2A and 2B are schematic circuit diagrams of a wireless charging system according to an embodiment of the invention.
Figure 2B:
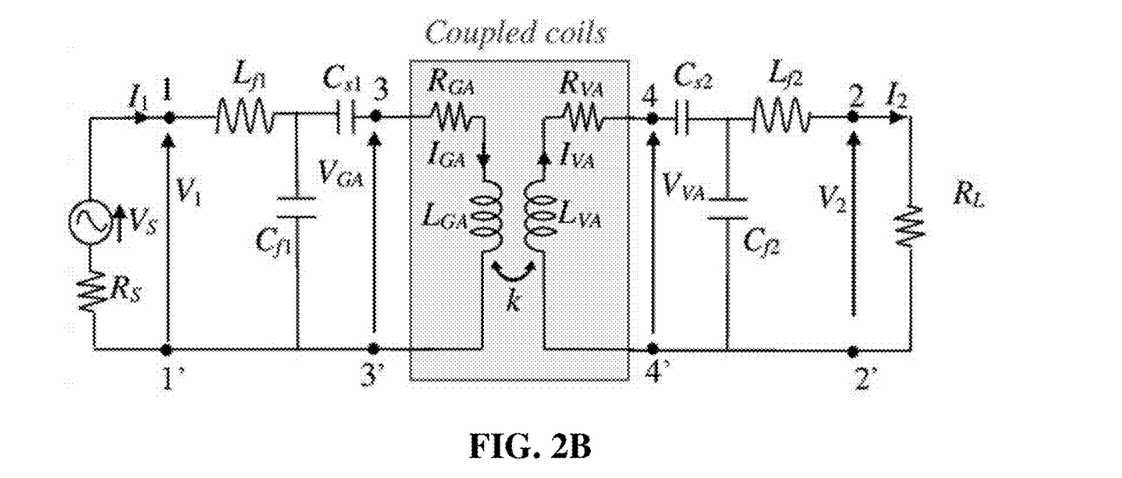

FIG. 1 is a schematic diagram of a general wireless charging system 130 for a vehicle which includes a wireless power transmission apparatus 110 and a wireless power reception apparatus 120, and FIGS. 2A and 2B are schematic circuit diagrams which are applicable to the wireless charging system according to an embodiment of the invention.

With reference to FIG. 1, the wireless charging system 130 for a vehicle includes the wireless power transmission apparatus 110 installed on a floor of a certain region of an electricity charging station for a vehicle or a parking lot and the wireless power reception apparatus 120 installed at a lower portion of a vehicle 100 to face the wireless power transmission apparatus with a certain distance therebetween. The wireless power transmission apparatus 110 and the wireless power reception apparatus 120 may be configured to have a Ground assembly (GA) and a Vehicle assembly (VA). The wireless charging system 130 may be formed in an IPT or RIPT system, thereby including a coil winding in each of the wireless power transmission apparatus 110 and the wireless power reception apparatus 120.

With reference to FIGS. 2A and 2B, FIG. 2A illustrates a schematic circuit diagram of a series-series (SS) type of IPT wireless charging system to which a resonance circuit is applied, and FIG. 2B illustrates a schematic circuit diagram of an inductor-capacitor-capacitor (LCC) type of RIPT wireless charging system. In FIGS. 2A and 2B, a left circuit including a node 1 and a node 3 is a circuit of a coil pad at a side of a Ground assembly as the wireless power transmission apparatus and includes a coil $L_{GA}$, and a right circuit including a node 2 and a node 4 is a circuit of a coil pad at a side of a Vehicle assembly as the wireless power reception apparatus and includes a coil $L_{VA}$ which is coupled to the coil $L_{GA}$ and generates magnetically inductive power.

In FIGS. 2A and 2B, k represents a coupling coefficient of coupled coils and is in a range of 0<k<1. In general, when a current $I_1$ passing through a circuit 1 (GA) changes depending on time such that an electromotive force is generated due to magnetic induction in a circuit 2 (VA), a mutual inductance coefficient $M_{12}$ between the two circuits is calculated as follows:

$$V_2 = \dot{I}_1 M_{12}. \qquad \text{Equation (1)}$$

The mutual inductance coefficient $M_{12}$ is proportional to a square root of each of the inductive coefficients $L_1$ and $L_2$ of the two circuits, as the Equation (2) shows:

$$M_{12} = k\sqrt{L_1 L_2}. \qquad \text{Equation (2)}$$

Figure 3:
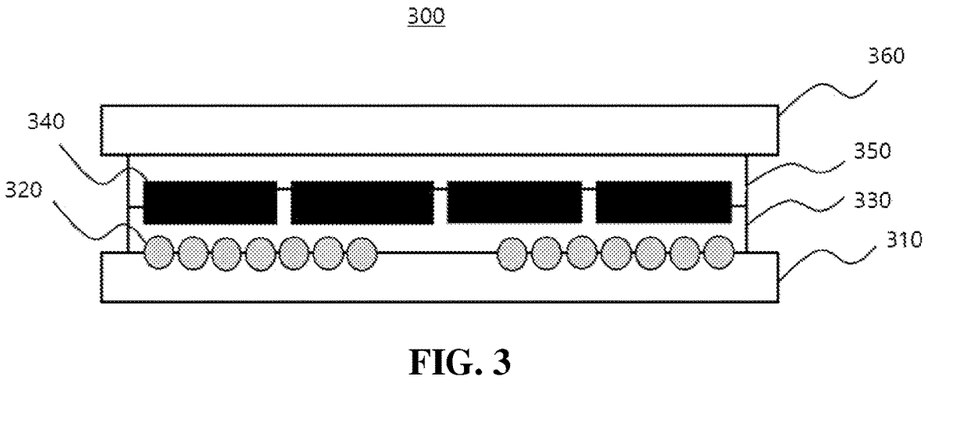
FIG. 3 is a cross-sectional view schematically illustrating a reception coil pad of the wireless power reception apparatus according to the embodiment of the invention.

FIG. 3 is a cross-sectional view schematically illustrating a reception coil pad 300 of the wireless power reception apparatus according to the embodiment of the invention. The wireless power reception apparatus 300 can include a lower tray 310, a coil winding 320, a thermally conductive polymer molding layer 330, a plurality of magnetic tiles 340, a magnetic field shielding plate 350, and a metal magnetic-field blocking layer 360.

With reference to FIG. 3, the lower tray 310 is formed to accommodate and fix the coil winding and may be formed to include a thermally conductive material so as to dissipate heat, which is generated from the coil winding 320 during wireless power reception, to the outside. The coil winding 320 is positioned on the lower tray 310 to be fixed thereto and can generate magnetically inductive power depending on a magnetic field which is generated at a coil of the wireless power transmission apparatus.

The plurality of magnetic tiles 340 may be positioned over the coil winding 320, and at least some or all of the plurality of magnetic tiles may be arranged at predetermined intervals. The predetermined intervals may be determined depending on effective permeability designed for a predetermined power reception rate. The plurality of magnetic tiles 340 include a magnetic material such that a leakage of an inductive magnetic field is reduced by absorbing the inductive magnetic field generated at the coil winding 320 or changing a path thereof and high magnetic coupling is induced to improve transfer efficiency. The plurality of magnetic tiles 340 may include a soft magnetic material, which is effective in increasing magnetic flux density with high permeability, low coercivity, a low hysteresis loss, and an eddy current loss. The soft magnetic material may include at least one of ferrite, permalloy, iron (Fe), a soft magnetic composite (SMC), permalloy (Fe50Ni50), Mn—Zn ferrite, Ni—Zn ferrite, Fe-(1 to 6.5 wt % of Si)—Cr, sendust (Fe85Si9.5Al5.5), Fe amorphous (Fe78B13Si9), Co amorphous (Co67Fe4B14.5Si4.5), and nanocrystals. Preferably, the soft magnetic material may include a ferrite.

Figure 4:
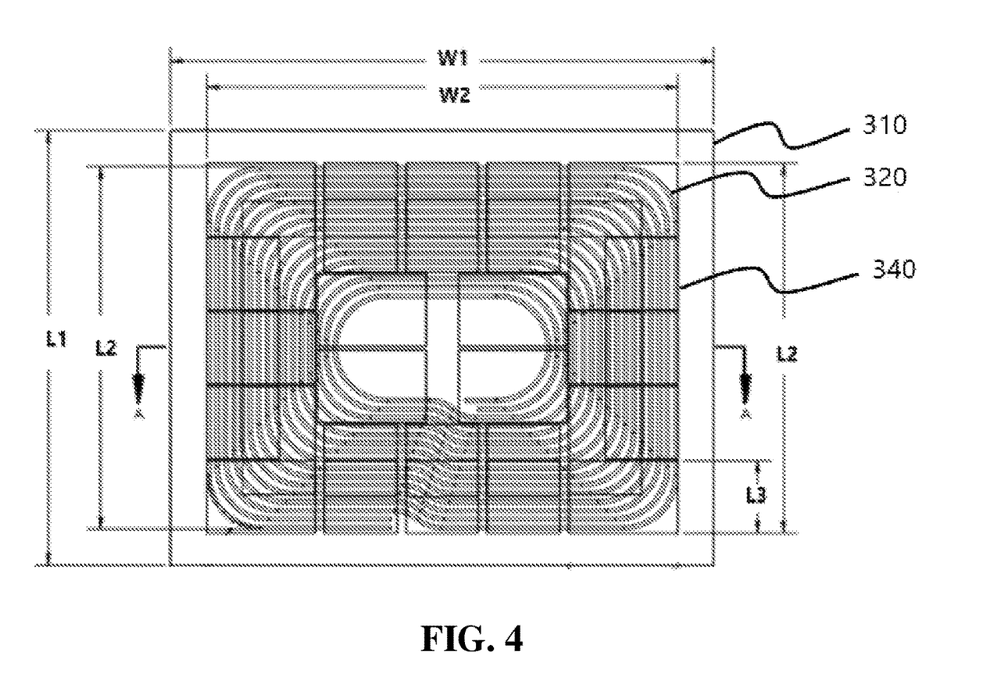
FIG. 4 is a projection plan view illustrating a plurality of magnetic tiles and a coil winding arranged on a lower tray of the reception coil pad of the wireless power reception apparatus according to the embodiment of the invention.

FIG. 4 is a projection plan view illustrating the plurality of magnetic tiles 340 and the coil winding 320 arranged on the lower tray 310 of the reception coil pad 300 of the wireless power reception apparatus according to the embodiment of the invention.

With reference to FIG. 4, coils of the coil winding 320 may be arranged to be wound at regular intervals in order to generate efficient inductive power. The lower tray 310 may include projections/recesses formed to accommodate the coil winding 310 at regular intervals. In FIG. 4, L1 and W1 represent a length and a width of the lower tray 310, respectively, L2 and W2 represent a length and a width of the coil winding 320, respectively. A cross-section of A-A in FIG. 4 may correspond to a cross-sectional view of FIG. 3.

With reference to FIG. 3 again, the magnetic field shielding plate 350 is positioned on the plurality of magnetic tiles 340, may be formed to accommodate and fix the plurality of magnetic tiles 340 at predetermined intervals, and blocks a magnetic field which is generated at the plurality of magnetic tiles 340 from the outside of the wireless power reception apparatus. The magnetic field shielding plate 350 may accommodate the plurality of magnetic tiles 340 to maintain separation thereof at the predetermined intervals and, thereby be formed as a coupled member of a magnetic tiles-magnetic field shielding plate.

Figure 5:
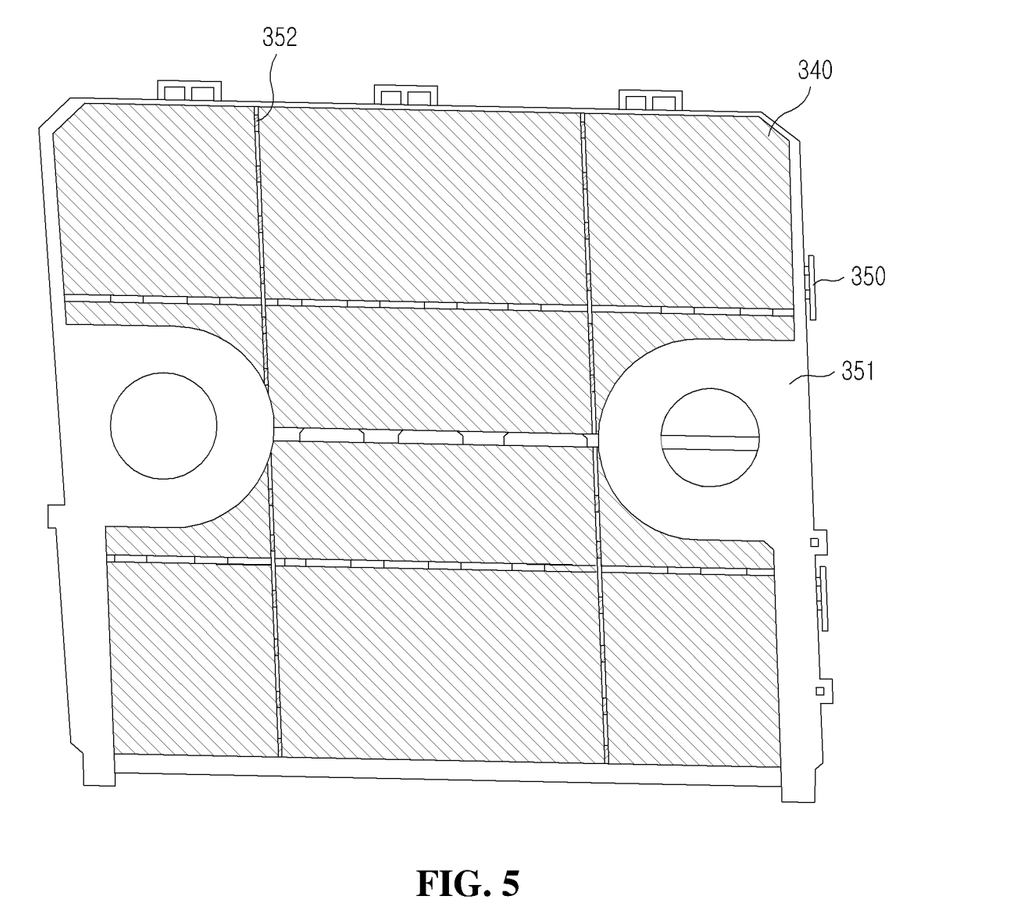
FIG. 5 is a perspective view of a coupled member of a magnetic tiles-magnetic field shielding plate according to the embodiment of the invention in the reception coil pad illustrated in FIG. 3.

FIG. 5 illustrates a perspective view of the coupled member of a magnetic tiles-magnetic field shielding plate according to the embodiment of the invention illustrated in FIG. 3.

With reference to FIG. 5, the magnetic field shielding plate 350 may include a holding part 351 and/or projections/recesses 352 formed to accommodate and fix the plurality of magnetic tiles 340 at the predetermined intervals. Here, there is problem that, even when the coupled member of a magnetic tiles-magnetic field shielding plate is formed as described above, breaking or shattering of the plurality of magnetic tiles 340 due to an external impact or vibration of a vehicle may cause the magnetic field shielding plate 350 not to fix the plurality of magnetic tiles 340 and maintain the original arrangement and intervals thereof so that pieces of the magnetic tiles may be shattered in spaces within the reception coil pad.

With reference to FIG. 3 again, the thermally conductive polymer molding layer 330 may be formed between the coil winding 320 and the plurality of magnetic tiles 340 to fill spaces between the coil winding 320 and the plurality of magnetic tiles 340 and bond the coil winding and the plurality of magnetic tiles, or bond the coil winding and the coupled member of magnetic tiles-magnetic field shielding plate. The thermally conductive polymer molding layer 330 may be formed to further fill the spaces between the coils of the coil winding 320 and the spaces between the plurality of magnetic tiles 340.

According to such thermally conductive polymer molding layer 330, even though a vehicle, in which the wireless power reception apparatus is installed, get an impact or vibration from the outside and the plurality of magnetic tiles 340 are broken or shattered, the thermally conductive polymer molding layer 330 can still keep the plurality of magnetic tiles 340 in place and can secure an original tile shape such that it is possible to maintain the intervals between the magnetic tiles for the desired permeability. Thus, magnetic performance of the plurality of magnetic tiles 340 may be maintained to prevent a reduction in wireless power reception rate and extend a service life of the reception coil pad of the wireless power reception apparatus. Additionally, the thermally conductive polymer molding layer 330 can fix and keep the coil winding 320 in place at the same time, and thus it is possible to prevent the coil winding 320 from being detached from the lower tray 310 or prevent the arrangement of the coils at the predetermined intervals from being changed due to an external impact or vibration of a vehicle in which the wireless power reception apparatus is installed. Simultaneously, the thermally conductive polymer molding layer 330 can increase thermal conductivity by removing air gaps in the spaces between the coil winding 320 and the plurality of magnetic tiles 340 and/or in the spaces between the coil turns of the coil winding 320, thereby increasing capability for heat dissipation of the reception coil pad.

Therefore, an effect of preventing a reduction in magnetic performance and wireless power reception rate of the wireless power reception apparatus even when a mileage of an electric car increases is achieved. In addition, the thermally conductive polymer molding layer 330 has effects of strengthening functions of impact resistance, vibration resistance, water resistance, and dust resistance while the wireless power reception apparatus maintains high heat dissipation.

The thermally conductive polymer molding layer 330 may include at least one polymer such as epoxy, silicon, and urethane. The thermally conductive polymer molding layer 330 may include at least one mixture of the polymer and fillers of alumina, aluminum hydroxide (Al(OH)3 or ATH), boron nitride (BN), and the like. In the other embodiment of the invention, the thermally conductive polymer molding layer 330 may be formed to include a mixture of a heat-resistant polymer and thermally conductive fillers.

In the other embodiment of the invention, the thermally conductive polymer molding layer 330 may be formed to include a mixture of thermally conductive polymers in which soft magnetic metal particles are dispersed. The soft magnetic metal particles may include at least one of iron (Fe), permalloy (Fe50Ni50), Mn—Zn ferrite, Fe-(1 to 6.5 wt % of Si), sendust (Fe85Si9.5Al5.5), Fe amorphous (Fe78B13Si9), Co amorphous (Co67Fe4B14.5Si4.5), and a nanocrystal alloy or a mixture thereof. The thermally conductive polymer may include at least one of epoxy, silicon, and urethane, or any one selected from a group consisting of alumina ($Al_2O_3$), BeO, ZnO, MgO, SiC, AlN, SiZN, BN, carbon nanotube, diamond, and a combination thereof or a mixture with the combination.

When the thermally conductive polymer molding layer 330 is formed to include the mixture of the thermally conductive polymers in which soft magnetic metal particles are dispersed, it is possible to achieve an effect of increasing a value of the coupling coefficient k of the magnetic induction coupling such that the mutual inductance coefficient $M_{12}$ is increased and thereby increasing the power reception efficiency due to the magnetic induction of the wireless power reception apparatus, in addition to the effects described above.

With reference to FIG. 3, the metal shielding layer 360 may be positioned on the magnetic field shielding plate 350 and blocks a magnetic field generated from the reception coil pad of the wireless power reception apparatus from adversely affecting another instrument or an occupant in a vehicle. The metal shielding layer may include at least one of aluminum and copper.

Figure 6:
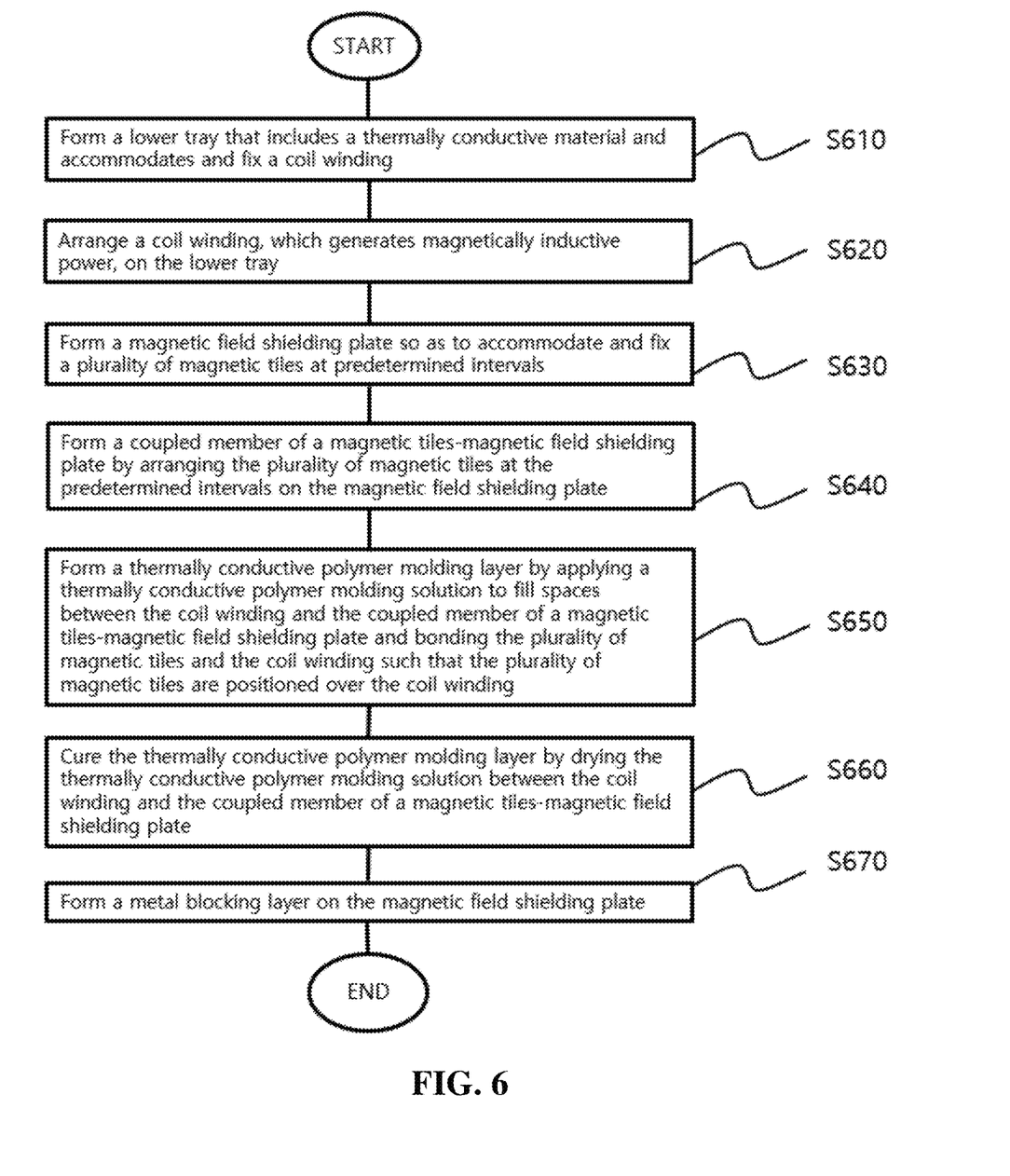
FIG. 6 is a flowchart schematically illustrating a method of manufacturing the reception coil pad in the wireless power reception apparatus according to the embodiment of the invention.

FIG. 6 is a flowchart schematically illustrating a method of manufacturing the reception coil pad in the wireless power reception apparatus according to the embodiment of the invention.

With reference to FIG. 6, in Step S610, the lower tray 310 may be formed to accommodate and fix the coil winding 320 at predetermined intervals. The lower tray 310 may include a thermally conductive material. The lower tray 310 may be formed to include projections/recesses configured to accommodate the coil winding 310 at predetermined intervals.

In Step S620, the coil winding 320 that generates inductive power may be arranged and/or formed on the lower tray 310 (S620). With reference to FIG. 4, the coil winding 320 may be fixed to have the coils separated at predetermined intervals on the lower tray 310.

In Step S630, the magnetic field shielding plate may be formed to accommodate and fix the plurality of magnetic tiles at predetermined intervals. The predetermined intervals may be determined depending on the effective permeability designed for a desired power reception rate. With reference to FIG. 5, the magnetic field shielding plate 350 may be formed to include the holding part 351 and/or the projections/recesses 352, which are formed to accommodate and fix the plurality of magnetic tiles 340 at the predetermined intervals.

In Step S640, the coupled member of a magnetic tiles-magnetic field shielding plate may be formed by arranging the plurality of magnetic tiles 340 at predetermined intervals on the magnetic field shielding plate 350. FIG. 5 illustrates the coupled member of a magnetic tiles-magnetic field shielding plate according to the embodiment of the invention. The coupled member of a magnetic tiles-magnetic field shielding plate may be formed by arranging the plurality of magnetic tiles at the predetermined intervals on the magnetic field shielding plate and then bonding to the metal alloy composite magnetic body. The plurality of magnetic tiles 340 may include a magnetic material such that a leakage of an inductive magnetic field decreases by absorbing the inductive magnetic field generated at the coil winding 320 or changing a path thereof and high magnetic coupling is induced to improve transfer efficiency. The plurality of magnetic tiles 340 may be formed to include a soft magnetic material, which includes at least one of ferrite, permalloy, iron (Fe), a soft magnetic composite (SMC), permalloy (Fe50Ni50), Mn—Zn ferrite, Ni—Zn ferrite, Fe-(1 to 6.5 wt % of Si)—Cr, sendust (Fe85Si9.5Al5.5), Fe amorphous (Fe78B13Si9), Co amorphous (Co67Fe4B14.5Si4.5), and nanocrystals, or a mixture thereof. Preferably, the plurality of magnetic tiles 340 may include a ferrite.

In Step S650, the thermally conductive polymer molding layer 330 may be formed by applying the thermally conductive polymer molding solution to fill spaces between the coil winding 320 and the coupled member of a magnetic tiles-magnetic field shielding plate and bond the coil winding 320 and the plurality of magnetic tiles 340 such that the plurality of magnetic tiles 340 are positioned over the coil winding 320. The thermally conductive polymer molding layer 330 may be formed to further fill the spaces between the coils of the coil winding 320 and the spaces between the plurality of magnetic tiles 340.

The thermally conductive polymer molding solution may be applied on the coupled member of a magnetic tiles-magnetic field shielding plate and may be positioned to be bonded on the coil winding 320. In addition, according to the other embodiment of the invention, the thermally conductive polymer molding solution may be additionally applied on the coil winding 320 positioned on the lower tray 310, and then the coupled member of a magnetic tiles-magnetic field shielding plate, on which the molding solution is also applied, may be positioned to be bonded. However, a method of applying and filling the thermally conductive polymer molding solution to the space between the coil winding 320 and the coupled member of a magnetic tiles-magnetic field shielding plate is not limited thereto.

The thermally conductive polymer molding layer 330 may include at least one polymer such as epoxy, silicon, and urethane. The thermally conductive polymer molding layer 330 may include at least one mixture of the polymer and fillers of alumina, aluminum hydroxide (Al(OH)3 or ATH), boron nitride (BN), and the like. In the other embodiment of the invention, the thermally conductive polymer molding layer 330 may be formed to include a mixture of a heat-resistant polymer and thermally conductive fillers.

In the other embodiment of the invention, the thermally conductive polymer molding layer 330 may be formed to include a mixture of thermally conductive polymers in which soft magnetic metal particles are dispersed. The soft magnetic metal particles may include at least one of iron (Fe), permalloy (Fe50Ni50), Mn—Zn ferrite, Fe-(1 to 6.5 wt % of Si), sendust (Fe85Si9.5Al5.5), Fe amorphous (Fe78B13Si9), Co amorphous (Co67Fe4B14.5Si4.5), and a nanocrystal alloy or a mixture thereof. The thermally conductive polymer may include at least one of epoxy, silicon, and urethane, or any one selected from a group consisting of alumina ($Al_2O_3$), BeO, ZnO, MgO, SiC, AlN, SiZN, BN, carbon nanotube, diamond, and a combination thereof or a mixture of the combination.

When the thermally conductive polymer molding layer 330 is formed to include the mixture of the thermally conductive polymers in which soft magnetic metal particles are dispersed, it is possible to achieve an effect of increasing a value of the coupling coefficient k of the magnetic induction coupling such that the mutual inductance coefficient $M_{12}$ is increased and thereby increasing the power reception efficiency generated due to the magnetic induction of the wireless power reception apparatus, in addition to the effects described above.

In Step S660, thermally conductive polymer molding layer 330 may be cured by drying the thermally conductive polymer molding solution applied to spaces between the coil winding 320 and the coupled member of a magnetic tiles-magnetic field shielding plate. The drying process may be performed for 30 min to 90 min. at a temperature of 60° C. to 100° C. However, the conditions of the drying process are not limited thereto.

In Step S670, the metal blocking layer 360 may be formed on the magnetic field shielding plate 350. The metal blocking layer 360 may include at least one of aluminum and copper. According to the other embodiment of the invention, when the magnetic field shielding plate 350 is formed to sufficiently shield a magnetic field generated at the reception coil pad 300 from the outside of the wireless power reception apparatus, Step S670 may be omitted from a process of manufacturing the reception coil pad 300 of the wireless power reception apparatus.

According to the process of manufacturing the reception coil pad of the wireless power reception apparatus, the thermally conductive polymer molding solution is applied to fill the spaces between the coil winding 320 and the plurality of magnetic tiles 340, and thereby the thermally conductive polymer molding layer 330 is formed. Hence, even though a vehicle, in which the wireless power reception apparatus is installed, receives an impact or vibration from outside and the plurality of magnetic tiles 340 are broken or shattered, the thermally conductive polymer molding layer 330 can still keep the broken pieces of the plurality of magnetic tiles 340 in place and can secure the tile shape such that it is possible to maintain the intervals between the magnetic tiles. Thus, the magnetic performance of the plurality of magnetic tiles 340 may be maintained to prevent a reduction in wireless power reception rate and extend a service life of the reception coil pad of the wireless power reception apparatus. In addition, the thermally conductive polymer molding layer 330 can keep the coil winding 320 in place at the same time with the simplified, cheaper process of forming the further heat dissipation means, and thus it is possible to prevent the coil winding 320 from being detached from the lower tray 310 or prevent the arrangement of the coils at the predetermined intervals from being changed due to an external impact or vibration of a vehicle in which the wireless power reception apparatus is installed. Simultaneously, the thermally conductive polymer molding layer 330 can increase thermal conductivity by removing air gaps in the space between the coil winding 320 and the plurality of magnetic tiles 340 and/or in the spaces between the coils of the coil winding 320 and thereby heat dissipation of the reception coil pad may be increased, with the simplified, cheaper process of forming the further heat dissipation means.

Therefore, an effect of preventing a reduction in magnetic performance and wireless power reception rate of the wireless power reception apparatus even when a mileage of an electric car increases is achieved. In addition, the thermally conductive polymer molding layer 330 has effects of strengthening functions of impact resistance, vibration resistance, water resistance, and dust resistance while the wireless power reception apparatus maintains high heat dissipation, with the simplified, cheaper process of forming the further heat dissipation means.

In addition, when the thermally conductive polymer molding layer 330 is formed by a molding solution including the mixture of the thermally conductive polymers in which soft magnetic metal particles are dispersed, it is possible to achieve an effect of increasing a value of the coupling coefficient k of the magnetic induction coupling so as to further improve the power reception rate of the wireless power reception apparatus, in addition to the effects described above.

Experimental Example

According to the embodiment of the invention, the thermally conductive polymer molding solution may be manufactured by combining 30 wt % to 95 wt % of alumina ($Al_2O_3$) as the thermally conductive fillers with 0.4 wt % to 64 wt % of silicon polymer and 3.6 wt % to 6 wt % of silicone crosslinker and by further adding a small amount of platinum-based catalyst.

When the coil pad of the wireless power reception apparatus is manufactured by applying the thermally conductive polymer molding solution manufactured in the process to the space between the coil winding 320 and the plurality of magnetic tiles 340 and forming the thermally conductive polymer molding layer 330, values of physical properties of the wireless power reception apparatus are as illustrated in Table 1, the values being obtained from an experiment conducted with the wireless power reception apparatus. Here, a ferrite is used as the magnetic body.

TABLE 1

| | | |
|---|---|---|
| Power | 10 | (kW) |
| Efficiency (Power reception efficiency) | 92.1 | (%) |
| $V_{in}$_Tx (Transmission voltage) | 211 | (V) |
| $I_{in}$_Tx (Transmission current) | 45 | (A) |
| $V_{out}$_Rx (Reception voltage) | 700 | (V) |

TABLE 1-continued

| | | |
|---|---|---|
| $I_{out}$_Rx (Reception current) | 12.5 | (A) |
| Distance Z | 150 | (mm) |

Physical Properties of a Wireless Power Reception Apparatus Manufactured in Accordance with an Experimental Example of the Invention As illustrated in the table described above, the wireless power reception apparatus manufactured in accordance with the Experimental Example according to the embodiment of the invention is a wireless power reception apparatus designed to receive power capacity of 10 kW when a distance Z between a wireless power transmission apparatus and the wireless power reception apparatus is 150 mm. In this case, as a result of an experiment, when a transmission voltage $V_{in}$_Tx of the wireless power transmission apparatus is 211V, and a transmission current $I_{in}$_Tx thereof is 45 A, a reception voltage $V_{out}$_Rx of the wireless power reception apparatus, in which a coil pad manufactured in accordance with the experimental example of the invention is installed, is 700V, and a reception current $I_{out}$_Rx thereof is 12.5 A. Hence, initial wireless power reception efficiency of reception power to transmission power of the wireless power reception apparatus was about 92.1%. For reference, it is to be noted that the result of the above-described experiment is a value obtained without considering a result after arrangement of coil winding turns is changed and a magnetic body is shattered or broken due to an external impact applied to a vehicle over time.

Comparative Examples

Similarly to the experimental example, a reception coil pad of Comparative Example 1 was manufactured in accordance with the same conditions as in the method of manufacturing the reception coil pad of the wireless power reception apparatus according to the embodiment of the invention illustrated in FIG. 6; however, Comparative Example 1 indicates a case of omitting Steps S650 and S660. In other words, the thermally conductive polymer molding layer 330 filling the spaces between the coil winding 320 and the plurality of magnetic tiles 340 is not formed in the Comparative Example 1 at all in the same conditions as in the embodiment of the invention. In this case, experimental results of the initial power reception rate of the wireless power reception apparatus according to Comparative Example 1 are shown in Table 2. For reference, it is to be noted that the results represent physical properties indicating only the initial power reception rate without reflecting a case where an impact is applied to a vehicle from the outside over time.

TABLE 2

| | | |
|---|---|---|
| Power | 10 | (kW) |
| Efficiency | 88.1 | (%) |
| $V_{in}$_Tx | 211 | (V) |
| $I_{in}$_Tx | 45 | (A) |
| $V_{out}$_Rx | 700 | (V) |
| $I_{out}$_Rx | 12 | (A) |
| Distance Z | 150 | (mm) |

Physical Properties of a Wireless Power Reception Apparatus of Comparative Example 1

A reception coil pad of Comparative Example 2 was manufactured in accordance with the same conditions as in the method of manufacturing the reception coil pad of the wireless power reception apparatus according to the embodiment of the invention illustrated in FIG. 6; however, in Comparative Example 2, Steps S650 and S660 are omitted, and after Step S620, a step of disposing a sheet-shaped thermally conductive polymer layer on the coil winding 320 is additionally included instead. In other words, without forming the thermally conductive polymer molding layer 330 filling the spaces between the coil winding 320 and the plurality of magnetic tiles 340 or the spaces between the coil turns, the coil pad is manufactured to additionally include simply the sheet-shaped thermally conductive polymer layer in the space between the coil winding 320 and the plurality of magnetic tiles 340 instead. In this case, air gaps remain in the spaces between coil turns of the coil winding and the spaces between the coil winding and the sheet-shaped thermally conductive polymer layer. Experimental results of the initial power reception rate of the wireless power reception apparatus according to Comparative Example 2 are shown in Table 3. For reference, it is to be noted that results represent physical properties indicating only the initial power reception rate without reflecting a case where an impact is applied to a vehicle from outside over time.

TABLE 3

| Power | 10 (kW) |
| Efficiency | 90.0 (%) |
| $V_{in}\_Tx$ | 211 (V) |
| $I_{in}\_Tx$ | 45 (A) |
| $V_{out}\_Rx$ | 700 (V) |
| $I_{out}\_Rx$ | 12.2 (A) |
| Distance Z | 150 (mm) |

Physical Properties of a Wireless Power Reception Apparatus of Comparative Example 2

As may be known from the experimental results described above, the initial power reception efficiencies are 88.1% and 90.0% in Comparative Examples 1 and 2, respectively, whereas it is possible to know that the initial wireless power reception efficiency is improved to 92.1% in the Experimental Example according to the embodiment of the invention in which the thermally conductive polymer molding layer 330 is formed by applying the thermally conductive polymer molding solution to the space between the coil winding 320 and the plurality of magnetic tiles 340 to fill the air gaps in the coil pad.

Although only the initial wireless power reception efficiencies are compared in this context, a difference in wireless power reception efficiency between the Experimental Example and the Comparative Examples further increases over time. This is because, when heat generated at the coil winding in the coil pad is kept in the air gaps inside the coil pad, and thus a state where sufficient heat dissipation is not performed lasts over time, the power reception efficiency of the coil pad rapidly decreases as time elapses, and the decrease in power reception efficiency results in degradation of the wireless power reception apparatus. In the Experimental Example, the air gaps between the coil winding and the magnetic tiles are sufficiently filled with the thermally conductive polymer molding layer such that the inner air gaps are minimized, with the simplified, cheaper process of forming the heat dissipation means, and thereby degradation of the wireless power reception efficiency due to heat of the coil pad is minimized.

According to the invention, with a simplified, cheaper process of manufacturing the wireless power reception apparatus, a service life of the wireless power reception apparatus may be extended by maintaining magnetic performance and arrangement of the coil winding, and thus preventing a reduction in wireless power reception rate even when a magnetic body of the wireless power reception apparatus is broken or damaged due to a large impact occurring outside a vehicle.

According to the embodiments of the invention, it is possible to provide a wireless power reception apparatus and/or a method of manufacturing the wireless power reception apparatus which has strengthened functions of impact resistance, vibration resistance, water resistance, and dust resistance while maintaining high heat dissipation, with a simplified, cheaper process of manufacturing the wireless power reception apparatus.

According to the invention, in the wireless power reception apparatus, with a simplified, cheaper process of manufacturing the wireless power reception apparatus, power reception efficiency may be improved by minimizing air gaps between the coil winding and the magnetic body and between the coils so as to maximize heat dissipation, and the power reception efficiency may be prevented from being degraded due to a change in core loss of the magnetic body even after time elapses.

Effects of the invention are construed not to be limited to the above-mentioned effects but to include every effect that may be derived from configurations of the invention described in the detailed description of the preferred embodiments and claims of the invention.

The description of the invention above is provided as an example, and a person of ordinary skill in the art to which the invention belongs can understand that it is possible to easily modify the invention to another embodiment without changing the technical idea or essential feature of the invention. Therefore, the embodiments described above are provided to be understood as exemplified examples in every aspect and not as examples limiting the invention. For example, the configurational elements described in singular forms may be realized in a distributed manner. Similarly, the configurational elements described in a distributed manner may be realized in a coupled manner.

The scope of the invention has to be represented by the claims to be described below, and meaning and the scope of the claims and every modification or modified embodiment derived from an equivalent concept of the claims have to be construed to be included in the scope of the invention.

What is claimed is:

1. A wireless power reception apparatus comprising:
a lower tray that includes a thermally conductive material and is formed to accommodate and fix a coil winding;
the coil winding that is positioned on the lower tray and generates magnetically inductive power;
a plurality of magnetic tiles that are positioned over the coil winding;
a magnetic field shielding plate that shields a magnetic field, accommodates the plurality of magnetic tiles, and fixes the plurality of magnetic tiles at predetermined intervals with convex parts to form a coupled member of the magnetic tiles-magnetic field shielding plate;
a metal shielding layer formed on the magnetic field shielding plate; and
a thermally conductive polymer molding layer that is located between the coil winding and the plurality of magnetic tiles, fills spaces between the coil winding on the lower tray and the coupled member of the magnetic tiles-magnetic field shielding plate, and bonds the coil winding on the lower tray and the coupled member of the magnetic tiles-magnetic field shielding plate, wherein the thermally conductive polymer molding layer fills the spaces between the coil winding on the lower tray and the coupled member of the magnetic tiles-magnetic field shielding plate, spaces between coils of the coil winding, and spaces between the plurality of magnetic tiles.

2. The wireless power reception apparatus according to claim 1, wherein the magnetic tiles include a soft magnetic material, which includes at least one of ferrite, permalloy, iron (Fe), a soft magnetic composite (SMC), permalloy (Fe50Ni50), Mn—Zn ferrite, Ni—Zn ferrite, Fe-(1 to 6.5 wt % of Si)—Cr, sendust (Fe85Si9.5A15.5), Fe amorphous (Fe78B13Si9), Co amorphous (Co67Fe4B14.5Si4.5), and nanocrystals.

3. The wireless power reception apparatus according to claim 1, wherein the thermally conductive polymer molding solution includes a mixture of a polymer including at least one of epoxy, silicon, and urethane and at least one thermally conductive filler of alumina, aluminum hydroxide (Al(OH)3 or ATH), and boron nitride (BN).

4. The wireless power reception apparatus according to claim 1, wherein the thermally conductive polymer molding layer includes a mixture of a heat-resistant polymer and thermally conductive fillers.

5. The wireless power reception apparatus according to claim 1, wherein the thermally conductive polymer molding layer includes a mixture of thermally conductive polymers in which soft magnetic metal particles are dispersed.

6. The wireless power reception apparatus according to claim 5, wherein the soft magnetic metal particles include at least one of iron (Fe), permalloy (Fe50Ni50), Mn—Zn ferrite, Fe-(1 to 6.5 wt % of Si), sendust (Fe85Si9.5A15.5), Fe amorphous (Fe78B13Si9), Co amorphous (Co67Fe4B14.5Si4.5), and a nanocrystal alloy or an alloy thereof, and wherein the thermally conductive polymer includes at least one of epoxy, silicon, and urethane or a mixture thereof.

* * * * *